United States Patent
Pfitzner

(10) Patent No.: US 8,246,185 B2
(45) Date of Patent: Aug. 21, 2012

(54) MIRROR ARRANGEMENT OF A LASER PROCESSING SYSTEM

(75) Inventor: Dieter Pfitzner, Weil der Stadt (DE)

(73) Assignee: TRUMPF Werkzeugmaschinen GmbH +Co. KG, Ditzingen (DE)

( * ) Notice: Subject to any disclaimer, the term of this patent is extended or adjusted under 35 U.S.C. 154(b) by 546 days.

(21) Appl. No.: 12/193,973

(22) Filed: Aug. 19, 2008

(65) Prior Publication Data
US 2009/0073587 A1   Mar. 19, 2009

Related U.S. Application Data

(63) Continuation-in-part of application No. PCT/EP2006/001723, filed on Feb. 24, 2006.

(51) Int. Cl.
*G02B 5/08* (2006.01)
*G02B 5/10* (2006.01)

(52) U.S. Cl. .......................... 359/850; 359/853
(58) Field of Classification Search .......... 359/850, 359/853
See application file for complete search history.

(56) References Cited

U.S. PATENT DOCUMENTS

| 29,166 | A | 7/1860 | Hartsfield |
| 5,148,326 | A | 9/1992 | Hohberg |
| 6,791,057 | B1 * | 9/2004 | Kratzsch et al. ......... 219/121.63 |
| 2003/0203602 | A1 | 10/2003 | Tanaka |

FOREIGN PATENT DOCUMENTS

| DE | 4129239 | 3/1993 |
| DE | 19852302 | 5/2000 |
| DE | 10222786 | 11/2003 |
| EP | 0 098 048 | 1/1984 |
| EP | 0 468 328 | 1/1992 |
| JP | 2000135583 | 5/2000 |

OTHER PUBLICATIONS

International Search Report and Written Opinion from corresponding PCT Application No. PCT/EP/2006/001723, mailed Nov. 9, 2006, 12 pages.
International Preliminary Report on Patentability from corresponding PCT Application No. PCT/EP/2006/001723, mailed Sep. 4, 2008, 7 pages.
International Preliminary Report on Patentability from corresponding PCT Application No. PCT/EP/2006/001723, mailed Oct. 23, 2008, 6 pages (English-language version).

* cited by examiner

*Primary Examiner* — Jade R Chwasz
(74) *Attorney, Agent, or Firm* — Fish & Richardson P.C.

(57) ABSTRACT

A mirror arrangement for a laser processing system includes a mirror configured to deflect laser radiation incident on the mirror arrangement onto a workpiece. The mirror arrangement includes first, second, and third mirror regions. A surface of the third mirror region is parallel to or recessed from a direction of propagation of the laser radiation incident on the mirror arrangement such that the third mirror region forms a shadow zone.

26 Claims, 5 Drawing Sheets

MIRROR ARRANGEMENT OF A LASER PROCESSING SYSTEM

CROSS-REFERENCE TO RELATED APPLICATIONS

This application is a continuation-in-part of and claims priority under 35 U.S.C. §120 to PCT Application No. PCT/EP2006/001723, filed on Feb. 24, 2006. The contents of this priority application is hereby incorporated by reference in its entirety.

TECHNICAL FIELD

This disclosure relates to a mirror arrangement of a laser processing system. The mirror arrangement includes a mirror for focusing and/or deflecting the laser radiation onto a workpiece.

BACKGROUND

Mirror arrangements can be used in laser processing systems. An apertured mirror can be used to integrate sensors in a laser processing head. However, as a result of an aperture being formed for the apertured mirror, laser radiation is lost. To prevent, or minimize, the loss of laser radiation a beam trap for the laser radiation caught in the aperture can be integrated in the laser processing head. An apertured mirror can be poorly suited when Gaussian mode lasers are being used.

A scraper mirror can be formed to integrate sensors in a laser processing head. In a scraper mirror, the laser radiation is captured in a ring shape located at a periphery of a mirror and focused onto an optical sensor. In the case of spatial optical sensors, such as, for example, line cameras or matrix cameras, use of the scraper mirror can result in poor imaging quality and a small depth of field.

SUMMARY

In one general aspect, a mirror arrangement for a laser processing system includes a mirror configured to deflect laser radiation incident on the mirror arrangement onto a workpiece. The mirror arrangement includes first, second, and third mirror regions. A surface of the third mirror region is parallel to or recessed from a direction of propagation of the laser radiation incident on the mirror arrangement such that the third mirror region forms a shadow zone.

Implementations can include one or more of the following features. The mirror can be further configured to focus the laser radiation incident on the mirror arrangement. The first and second mirror regions can be provided for focusing the laser radiation incident on the mirror. One or more of a sensor, a camera, or a measuring light source can be arranged in the shadow zone. The third mirror region can include an opening behind which a sensor or a measuring light source is arranged. The opening can include a passage through the mirror arrangement. The sensor can include a camera. The measuring light source can include one or more of a light emitting diode (LED) or a laser diode. A step can displace the first mirror region from the second mirror region to form the third mirror region. The step can be recessed from the laser radiation incident on the mirror arrangement. The first and second mirror regions can have a common focal point. A protective glass plate can be arranged in the region of the shadow zone. The third mirror region can be located between the first mirror region and the second mirror region.

In another general aspect, a laser processing system includes a laser configured to generate laser radiation and a mirror configured to deflect laser radiation incident on the mirror arrangement onto a workpiece. The mirror includes first, second, and third mirror regions, where a surface of the third mirror region is parallel to or recessed from a direction of propagation of the laser radiation incident on the mirror arrangement such that the third mirror region forms a shadow zone.

Implementations include one or more of the following features. The mirror can be further configured to focus the laser radiation incident on the mirror arrangement. The third mirror region can include a passage. A sensor or a measuring light source can be included in the passage. An optical axis of the sensor or the measuring light source can be approximately coaxial with the laser radiation deflected onto the workpiece and the laser radiation can be split into two part-beams. The sensor can include a camera. A cover can be placed over the passage, and the cover can be configured to absorb laser radiation reflected from the workpiece and to transmit measuring light reflected from the workpiece. The cover can include a glass plate. The sensor or measuring device can be behind the cover. A sensor can be configured to observe an interaction between the laser radiation deflected onto the workpiece and the workpiece, an evaluation device can be configured to analyze signals from the sensor, and a machine control can be coupled to the sensor and configured to control the laser based on the signals from the sensor. The sensor can be located behind a bore that passes through the second mirror region. A step can displace the second mirror region from the first mirror region to form the third mirror region recessed from a direction of propagation of the laser radiation incident on the mirror arrangement.

A mirror arrangement as discussed below can be used to integrate sensors or optical components in a laser processing head. A mirror arrangement in which two mirror regions are provided, in which one of the mirror regions is arranged such that a surface of the mirror region is substantially parallel to or recessed from a beam of laser radiation incident on the mirror arrangement. The mirror region substantially parallel to or recessed from the beam of laser radiation forms a shadow zone. No laser radiation is incident on the mirror region that forms the shadow zone.

A sensor, lens, or other optical component can be arranged in the shadow zone and used to observe the processing of a workpiece. In some implementations, a passage opening can be provided, and the passage opening can open to the shadow zone. In or behind an opening in the mirror region that forms the shadow zone, an optical component can be arranged in the shadow of the laser radiation. For example optical sensors, measuring light sources, cameras, or any components configured to monitor or observe the laser processing operation can be placed in the shadow of the laser radiation.

The mirror arrangement is suitable for laser beams that can be deflected by mirrors. Because carbon dioxide ($CO_2$) laser beams are frequently deflected and focused with mirrors (such as copper mirrors), the mirror arrangement can provide benefits to systems that include a $CO_2$ laser. The mirror arrangement can be placed at any location in the beam guide (or beam path) of a laser processing system. The mirror arrangement can be arranged appropriately according to the function of the optical components. Although the mirror arrangement provides benefits to systems that employ a $CO_2$ laser, the mirror arrangement can be used with other types of lasers, such as solid-state lasers (e.g., fiber lasers or diode lasers). The mirror arrangement can be constructed out of other mirror materials besides copper. For example, the mirror arrangement can be made from silicon.

The mirror arrangement that includes shadow zone is formed from at least two mirror regions, and it is therefore possible to provide a single mirror having at least two mirror regions or to use at least two mirror regions of two separate mirrors.

In some implementations, the mirror arrangement includes three mirror regions, two of which are configured for focusing laser radiation that is incident on the mirror arrangement. The third mirror region is arranged between the two mirror regions, and is configured for arrangement in the shadow of the laser radiation. In that manner, the focused laser beam is split into two focused part-beams. The component for monitoring or observing the laser processing operation can be arranged between the two focused part-beams. Optimum shielding of the component from laser radiation is thereby achieved.

If the one mirror region has a throughbore behind which the optical components for monitoring the laser processing operation are arranged, those components are able to observe the laser processing operation while also being protected from the laser radiation.

For protection from the laser radiation, the throughbore can be covered by a protective glass plate.

Further features and advantages of the techniques discussed above ensue from the following description of examples, from the figures, and from the claims. The individual features can be put into effect in a variant of the techniques discussed either individually, or in a plurality of any kind of combination.

DETAILED DESCRIPTION

Figure 1:
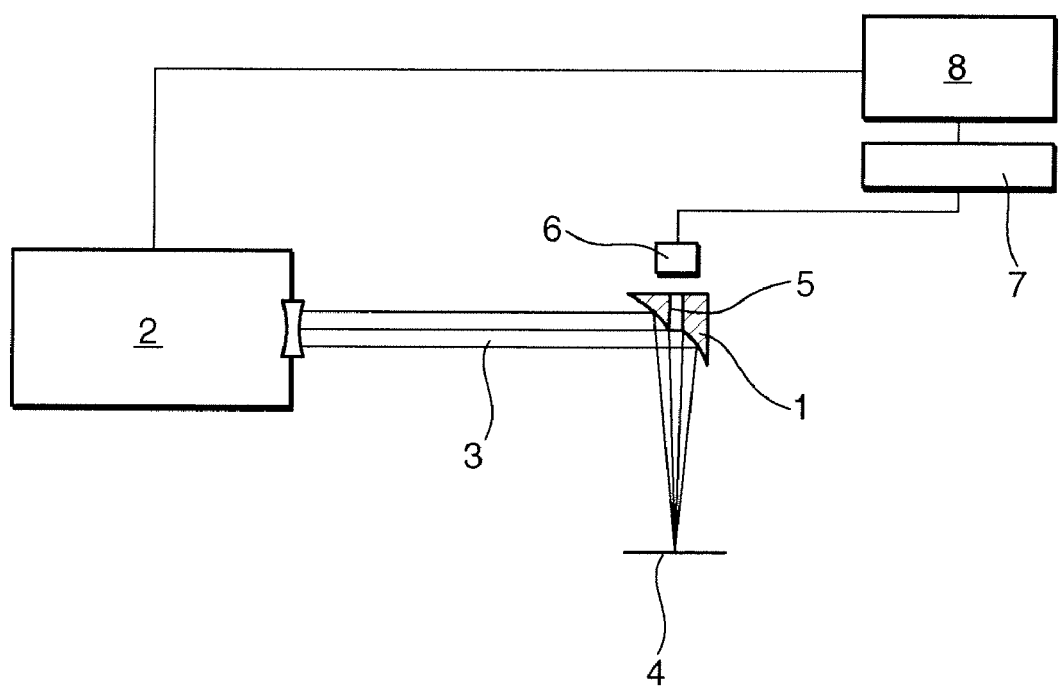
FIG. 1 is a diagram of a laser processing system.

Referring to FIG. 1, the integration of a mirror 1 in a laser processing system, such as a laser processing system used for laser welding, is shown. A laser beam 3 generated in a laser unit 2 is focused by the mirror 1 onto a workpiece 4. The mirror 1 has a throughbore 5 to enable the processing of the workpiece 4 to be observed by a sensor 6. Signals from the sensor 6 are transmitted to an evaluation device 7 that is connected to a machine control 8 for controlling the laser unit 2.

Figure 2A:
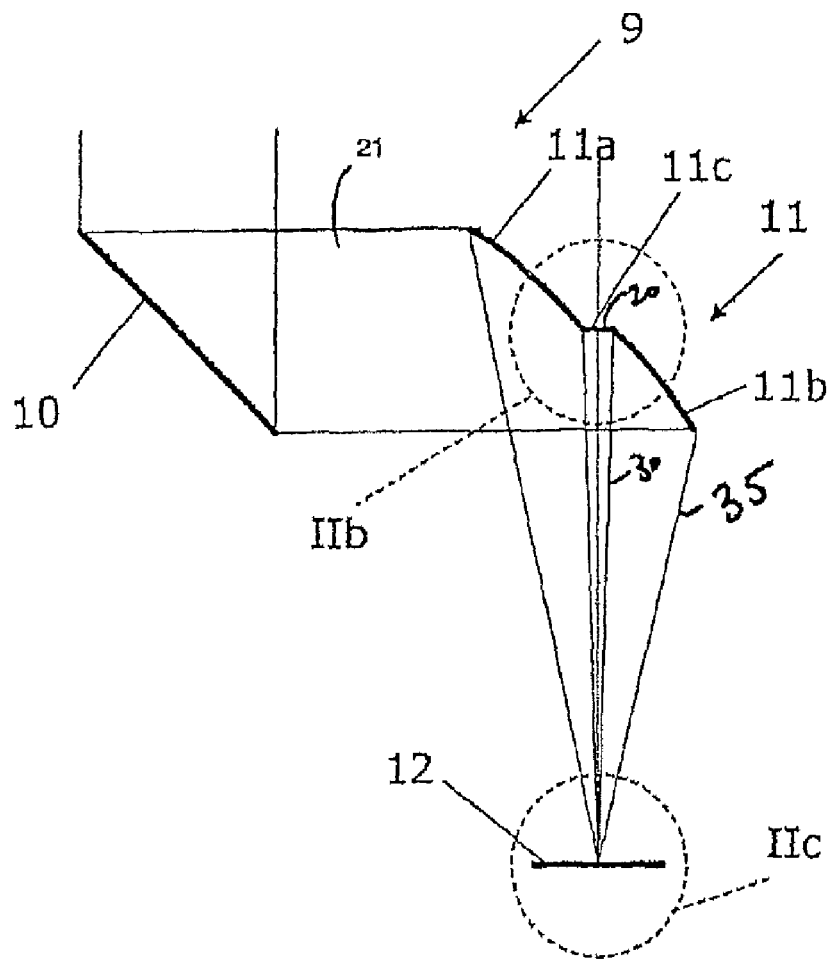
FIG. 2A is a diagram of a mirror arrangement that can be used in the laser processing system of FIG. 1.

Referring to FIG. 2A, a mirror arrangement 9 of the laser processing system includes a deflecting mirror 10 and a focusing mirror 11. Laser radiation 21 is deflected towards the focusing mirror 11 by the deflecting mirror 10 and is focused onto a workpiece 12 by the focusing mirror 11.

The focusing mirror 11 has a first mirror region 11a and a second mirror region 11b that can both be configured to focus the laser radiation 21 deflected by the deflecting mirror 10. Provided between the two mirror regions 11a and 11b there is a third mirror region 11c defined by a surface 20. The surface 20 is arranged parallel to the laser beam 21 deflected from the deflecting mirror 10 so that that the third mirror region 11c is shielded from the laser radiation 21, as if the third mirror region 11c were in a shadow. None of the laser radiation 21 is incident on the surface 20 of the third mirror region 11c, and the third mirror region 11c can be referred to as a shadow zone. The third mirror region 11c does not contribute either to beam deflection or to focusing. The third mirror region 11c does not, therefore, affect the laser radiation.

Figure 2B:
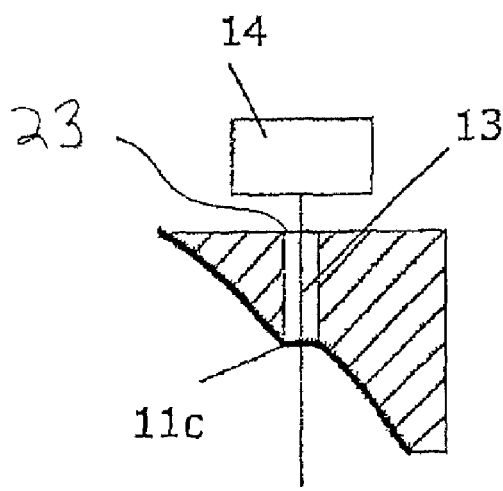
FIG. 2B is an enlarged cross-sectional view of a mirror arrangement that can be used in the laser processing system of FIG. 1.

Referring to FIG. 2B, the third mirror region 11c is provided with a throughbore 13 (which also can be referred to as a passage) behind which a sensor 14 is arranged. The sensor 14 is suitable for monitoring processes of the laser processing operating, for example for seam tracking or for process control by monitoring of the weld pool or the geometry of the weld seam. The sensor 14 is protected from any laser radiation directed towards the workpiece 12.

A sensor, lens, or other optical component can be arranged in the shadow zone 11c. For example optical sensors, measuring light sources, cameras, or any components configured to monitor or observe the laser processing operation can be placed in the shadow of the laser radiation. The focusing mirror 11 is suitable for use with any laser beam that can be deflected by a mirror. Because $CO_2$ laser beams are frequently deflected and focused with mirrors (such as copper mirrors), the focusing mirror 11 can provide benefits to systems that include a $CO_2$ laser. Although the focusing mirror 11 provides benefits to systems that employ a $CO_2$ laser, the mirror arrangement can be used with other types of lasers, such as solid-state lasers (e.g., fiber lasers or diode lasers). The mirror arrangement can be constructed out of other mirror materials besides copper. For example, the mirror arrangement can be made from silicon.

The focusing mirror 11 can be placed at any location in the beam guide (or beam path) of a laser processing system. For example, as shown in FIG. 2A, the focusing mirror 11 can be placed between the deflecting mirror 10 and the workpiece 12. However, in other examples, the deflecting mirror 10 can be placed between the focusing mirror 11 and the workpiece 12. The focusing mirror 11 can be arranged appropriately according to the function of the optical components.

Figure 2C:
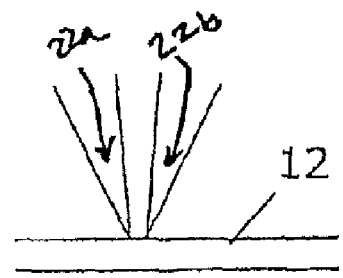
FIG. 2C is an enlarged view of a focused beam using the mirror arrangement of FIGS. 1-2B.

As a result of the division of the focusing mirror 11 into the two focusing mirror regions 11a and 11b, and as a result of the offset arrangement of the mirror regions 11a and 11b, beam splitting of the laser radiation incident on the focusing mirror 11 occurs. Referring to FIG. 2C, two foci 22a and 22b lying side by side can be produced on a surface of the workpiece 12. Alternatively, the surfaces of the two part-mirror regions 11a and 11b can be shaped in such a manner that the two foci 22a and 22b of the part-beams coincide.

The shadow zone produced at the step (which displaces the two focusing mirror regions 11a and 11b from each other to form the third mirror region 11c) of the focusing mirror 11 can be used for the placement of sensors or measuring light sources. No laser radiation is lost at the step or incident on the step. The focusing mirror 11 operates irrespective of the mode of the laser.

For carrying out optical measurements on the workpiece 12 surface, the following sensors can be arranged at the step: photodiode, a position sensitive detector (PSD), a charge-coupled device (CCD) camera or a complementary metal-oxide semiconductor (CMOS) camera. As a measuring light source for projection of two-dimensional incident light or of one or more lines of light onto the workpiece 12, LEDs or laser diodes, for example, can be used. For the placement of a plurality of sensors, measuring light sources or the like, analogously to the throughbore 13 a plurality of such bores can be provided.

The optical components are not necessarily arranged directly in the shaded mirror region 11c. The throughbores (such as the throughbore 13) serve to enable optical components to be arranged behind the shaded mirror region 11c, and the beam path 30 of the optical components extends coaxially with or at a slight angle to the laser beam 35 directed toward the workpiece 12. The beam path 30 can be split into two focused part beams that are not necessarily coaxial. By virtue of that arrangement, the optical components are protected from the laser radiation directed towards the workpiece 12.

The optical components can be further protected from the radiation reflected back from the workpiece 12 by a protective glass plate. The protective glass plate can include a suitable material that absorbs the laser radiation and transmits the measuring light. The protective glass plate also can include a material having a dichroic coating, which causes the back-reflected laser radiation to be reflected and the measuring light to be transmitted.

Figure 3:
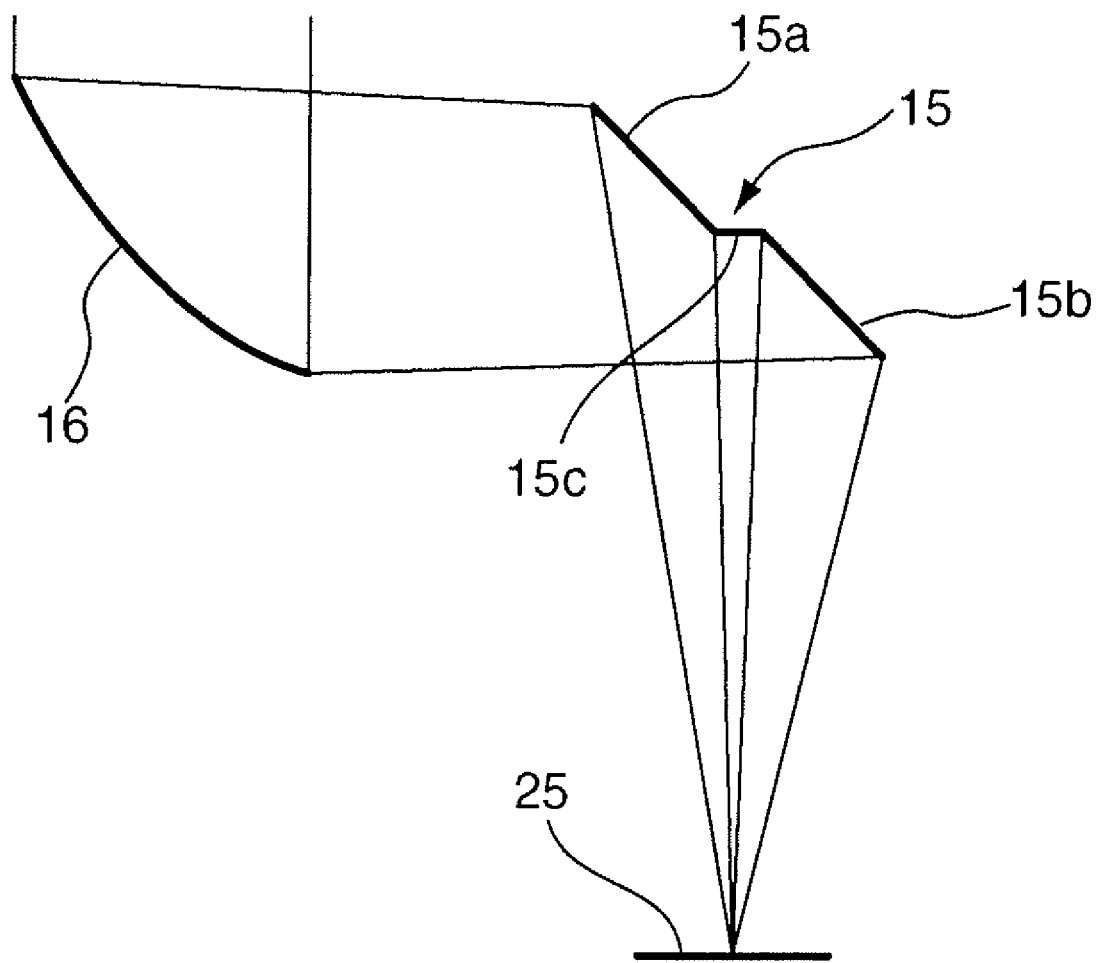
FIGS. 3-5 are diagrams of different implementations of a mirror arrangement that can be used in the laser processing system of FIG. 1.

Referring to FIG. 3, a deflecting mirror 15 has the mirror regions 15a, 15b, and 15c. The mirror region 15c forms a step or a shadow region. A focusing mirror 16 deflects the laser radiation toward the deflecting region 15 and focuses the laser radiation onto a workpiece 25. Similar to the third mirror region 11c discussed above with respect to FIG. 2A, a surface of the mirror region 15c is parallel to the direction of propagation of the laser radiation incident on the deflection mirror 15.

Figure 4:
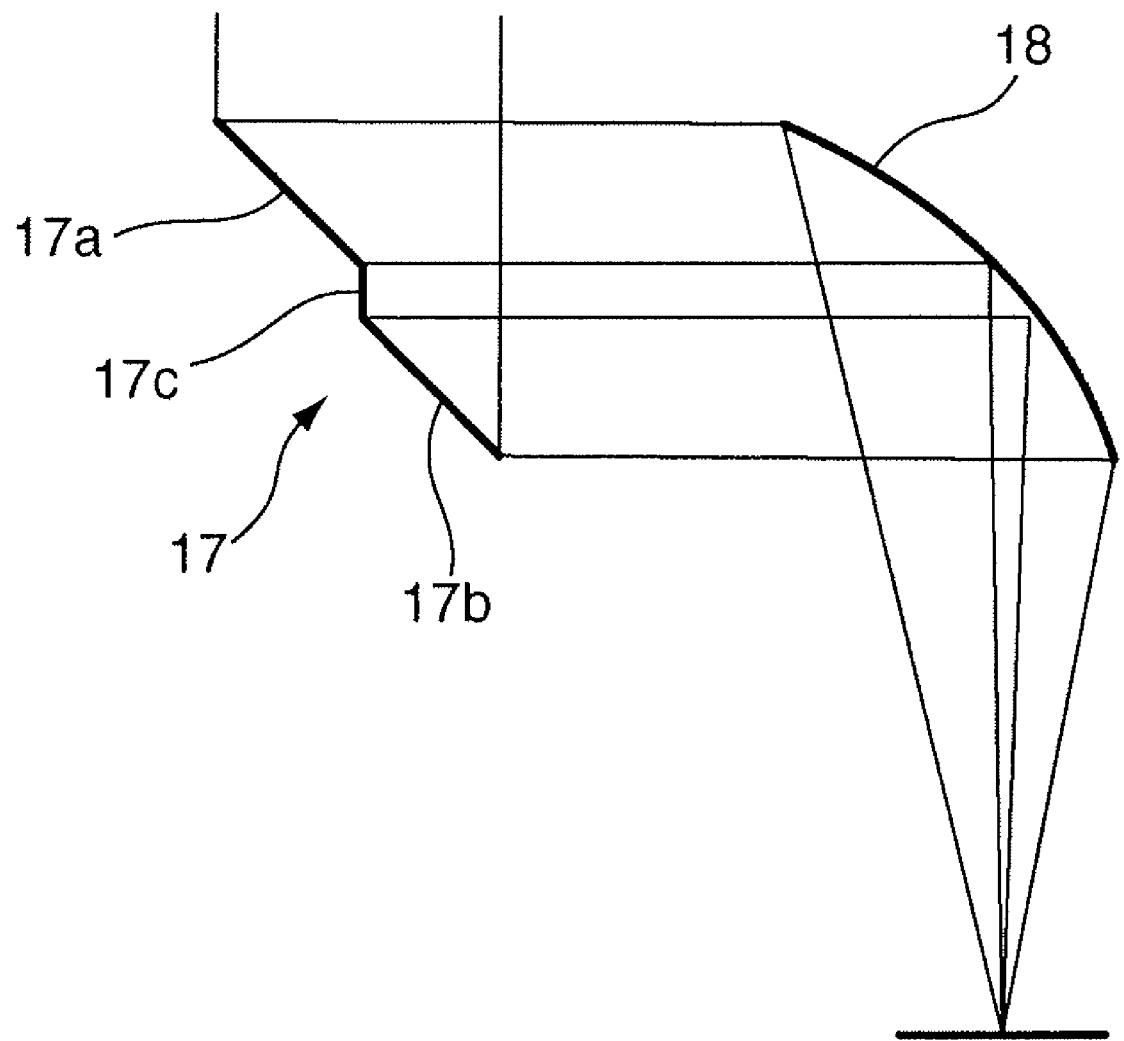

Referring to FIG. 4, a deflecting mirror 17 includes mirror regions 17a, 17b, and 17c with a step being formed at the mirror region 17c. A surface of the mirror region 17c is parallel to the direction of propagation of laser radiation incident on the mirror region 17c. Thus, the mirror region 17c forms a shadow zone onto which no laser radiation is incident. A focusing mirror 18 is located in the beam path downstream from the deflecting mirror 17. Thus, FIG. 4 shows an example in which the focusing mirror 18 is located downstream in the beam path from the deflecting mirror 17 (as compared to the example shown in FIG. 3, in which the focusing mirror 16 is located upstream from the deflecting mirror 15).

Figure 5:
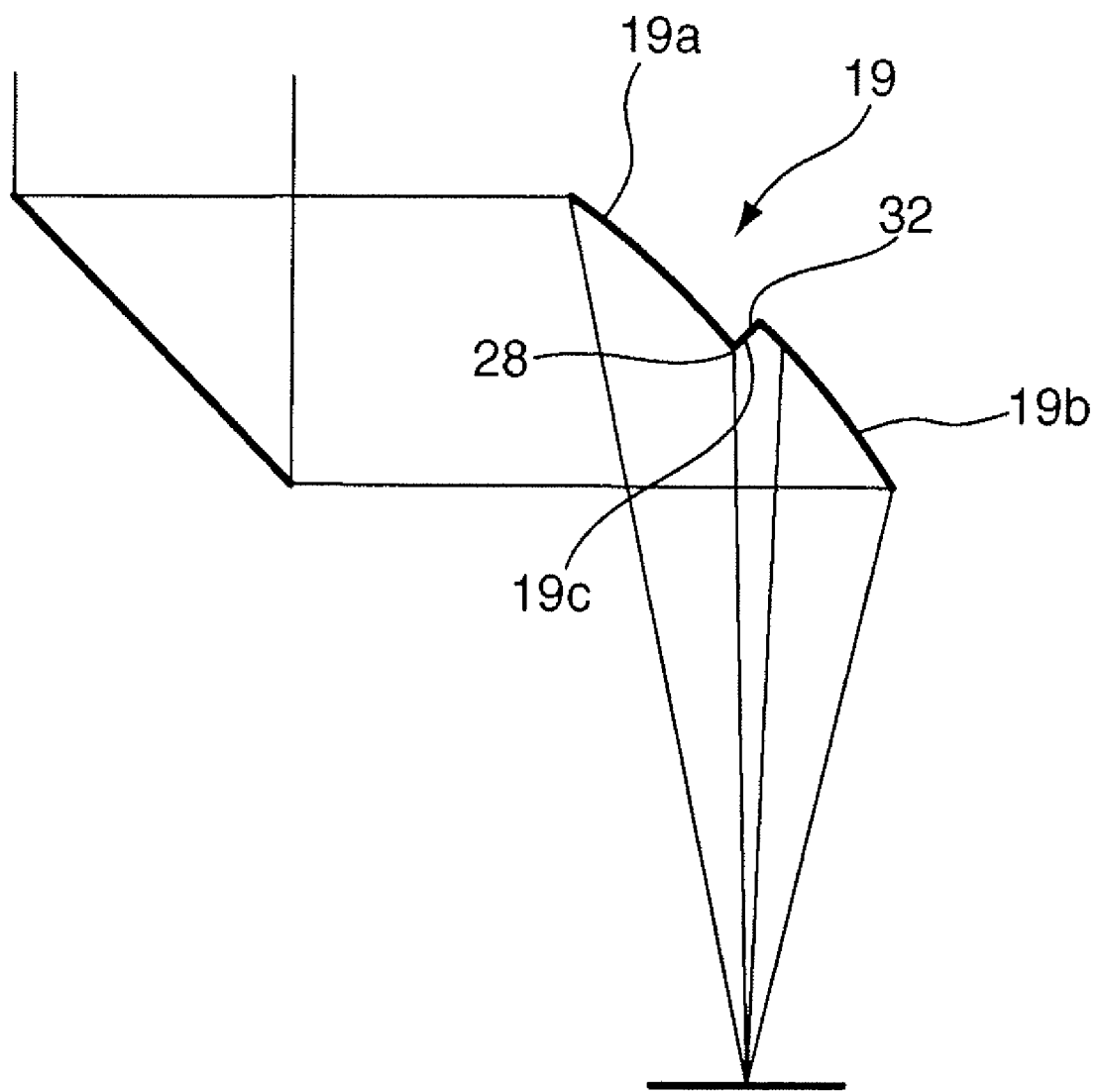

Referring to FIG. 5, a focusing mirror 19 has three mirror regions 19a, 19b, and 19c. A step (or shadow zone) is formed at the mirror region 19c. However, rather than the mirror region 19c being a surface that is parallel to the direction of propagation of laser radiation incident on the focusing mirror 19, a surface 32 of the mirror region 19c is recessed or set back from the laser radiation that is incident on the focusing mirror 19. Laser radiation is not incident on the mirror region 19c, and the mirror region 19c forms a shadow zone. The mirror region 19c is set back, or recessed, from an edge 28 on which the laser radiation is incident; however, laser radiation does not enter the mirror region 19c.

The foregoing description is intended to illustrate and not limit the scope of the techniques discussed above. Other aspects, advantages, and modifications are within the scope of the following claims.

What is claimed is:

1. A mirror arrangement for a laser processing system, the mirror arrangement comprising a mirror configured to deflect laser radiation incident on the mirror arrangement onto a workpiece, the mirror arrangement comprising:
   first, second, and third mirror regions, wherein a surface of the third mirror region is parallel to or recessed from a direction of propagation of the laser radiation incident on the mirror arrangement such that the third mirror region forms a shadow zone that is substantially shielded from the laser radiation incident on the mirror arrangement and wherein the first and second mirror regions deflect substantially all of the laser radiation incident on the mirror arrangement onto the workpiece; and
   wherein the surface of the third mirror region comprises an opening behind which an optical component is arranged.

2. The mirror arrangement of claim 1, wherein the mirror is further configured to focus the laser radiation incident on the mirror arrangement.

3. The mirror arrangement of claim 2, wherein the first and second mirror regions focus the laser radiation incident on the mirror.

4. The mirror arrangement of claim 3, wherein the first and second mirror regions have a common focal point.

5. The mirror arrangement of claim 1, wherein the optical component comprises one or more of a sensor, a camera, or a measuring light source.

6. The mirror arrangement of claim 5, wherein the sensor comprises a camera.

7. The mirror arrangement of claim 5, wherein the measuring light source comprises one or more of a light emitting diode (LED) or a laser diode.

8. The mirror arrangement of claim 1, wherein the opening comprises a passage through the mirror arrangement.

9. The mirror arrangement of claim 1, wherein a step displaces the first mirror region from the second mirror region to form the third mirror region.

10. The mirror arrangement of claim 9, wherein the step is recessed from the laser radiation incident on the mirror arrangement.

11. The mirror arrangement of claim 1, further comprising a protective glass plate arranged in the region of the shadow zone.

12. The mirror arrangement of claim 1, wherein the third mirror region is located between the first mirror region and the second mirror region.

13. The mirror arrangement of claim 1, wherein the surface of the third mirror region forms a lossless shadow zone.

14. A laser processing system, the laser processing system comprising:
   a laser configured to generate laser radiation;
   a mirror arrangement comprising a mirror configured to deflect laser radiation incident on the mirror arrangement onto a workpiece, the mirror arrangement comprising first, second, and third mirror regions, wherein a surface of the third mirror region is parallel to or recessed from a direction of propagation of the laser radiation incident on the mirror arrangement such that the surface of the third mirror region forms a shadow zone that is substantially shielded from the laser radiation incident on the mirror arrangement and wherein the first and second mirror regions deflect substantially all of the laser radiation incident on the mirror arrangement onto the workpiece; and
   one or more of a sensor, a camera, or a measuring light source arranged in the shadow zone.

15. The laser processing system of claim 14, wherein the mirror is further configured to focus the laser radiation incident on the mirror arrangement.

16. The laser processing system of claim 14, wherein the third mirror region comprises a passage.

17. The laser processing system of claim 16, wherein the one or more of a sensor, a camera, or a measuring light source is in the passage.

18. The laser processing system of claim 17, wherein an optical axis of the sensor or the measuring light source is approximately coaxial with the laser radiation deflected onto the workpiece and the laser radiation is split into two part-beams.

19. The laser processing system of claim 17, wherein the sensor comprises a camera.

20. The laser processing system of claim 16, further comprising a cover placed over the passage, the cover configured to absorb laser radiation reflected from the workpiece and to transmit measuring light reflected from the workpiece.

21. The laser processing system of claim 20, wherein the cover comprises a glass plate.

22. The laser processing system of claim 21, wherein the sensor or measuring device is behind the cover.

23. The laser processing system of claim 14 further comprising:
   a sensor configured to observe an interaction between the laser radiation deflected onto the workpiece and the workpiece;
   an evaluation device configured to analyze signals from the sensor;
   a machine control coupled to the sensor and configured to control the laser based on the signals from the sensor.

24. The laser processing system of claim 23, wherein the sensor is located behind a bore that passes through the second mirror region.

25. The laser processing system of claim 14, wherein a step displaces the second mirror region from the first mirror region to form the third mirror region recessed from a direction of propagation of the laser radiation incident on the mirror arrangement.

26. The laser processing system of claim 14, wherein the surface of the third mirror region forms a lossless shadow zone.

* * * * *